(12) United States Patent
Dongelmans (10) Patent No.: US 7,966,576 B2
(45) Date of Patent: Jun. 21, 2011

(54) METHOD AND SYSTEM FOR MOVING AN ICON ON A GRAPHICAL USER INTERFACE

(75) Inventor: Ronald R. F. Dongelmans, Nijmegen (NL)

(73) Assignee: Oce-Technologies B.V., Venlo (NL)

( * ) Notice: Subject to any disclaimer, the term of this patent is extended or adjusted under 35 U.S.C. 154(b) by 387 days.

(21) Appl. No.: 11/603,167

(22) Filed: Nov. 22, 2006

(65) Prior Publication Data

US 2007/0124697 A1      May 31, 2007

(30) Foreign Application Priority Data

Nov. 25, 2005   (EP) ..................................... 05111303

(51) Int. Cl.
*G06F 3/048* (2006.01)
(52) U.S. Cl. ........................ 715/822; 715/860
(58) Field of Classification Search .................. 715/822, 715/860
See application file for complete search history.

(56) References Cited

U.S. PATENT DOCUMENTS

| | | | |
|---|---|---|---|
| 5,682,489 A * | 10/1997 | Harrow et al. | 715/839 |
| 5,732,230 A | 3/1998 | Cullen et al. | |
| 5,852,440 A * | 12/1998 | Grossman et al. | 715/811 |
| 6,590,568 B1 | 7/2003 | Astala et al. | |
| 6,642,947 B2 * | 11/2003 | Feierbach | 715/861 |
| 6,976,224 B2 * | 12/2005 | Nii | 715/769 |

* cited by examiner

*Primary Examiner* — Dennis-Doon Chow
*Assistant Examiner* — Le Nguyen
(74) *Attorney, Agent, or Firm* — Birch, Stewart, Kolasch & Birch, LLP (57) ABSTRACT

A method of providing a graphical user interface includes displaying a graphic representation of a data object at an initial location, receiving a command selecting the data object from a user, moving the graphical representation of the data object towards a destination location upon receiving an indication of the destination location from a user, and causing an at least indirect transition of the object from a first state to a second state at a time when the graphical representation of the data object is positioned substantially at a final destination location. Output enables a user to distinguish the first state from the second state. A first timer is started in response to receiving an indication of a destination location from a user through the interface. The transition from the first state to the second state is automatically caused only after the first timer has run over a pre-determined period of time.

13 Claims, 4 Drawing Sheets

METHOD AND SYSTEM FOR MOVING AN ICON ON A GRAPHICAL USER INTERFACE

CROSS-REFERENCE TO RELATED APPLICATIONS

This nonprovisional application claims priority under 35 U.S.C. §119(a) on Patent Application No. 05111303.3, filed in the European Patent Office on Nov. 25, 2005, the entirety of which is incorporated herein by reference.

BACKGROUND OF THE INVENTION

1. Field of the Invention

The present invention relates to a method of providing a graphical user interface. The present invention also relates to a system for providing a graphical user interface. The present invention further relates to an apparatus, for example a document-processing apparatus. The present invention also relates to a computer program.

2. Description of Background Art

Respective examples of such a method, system and apparatus are known. For example, U.S. Pat. No. 5,732,230 discloses a system for manipulating image fragments so that image-processing devices such as copiers, fax machines and scanners may efficiently process oversize images. A configuration for a preferred embodiment includes a scanner, memory, CPU (Central Processing Unit), touch screen and printer. Illustrated steps form a loop that describes the steps a user performs to manipulate image fragments. At a first step, the user selects an image fragment on the display screen. Many forms of input may be used to perform the step. A preferred embodiment uses a touch screen so that the user may point to or touch areas of the display screen directly with their fingers or some other object such as a stylus. Next, a step is performed so that the user can move the selected fragment to a new position on the display screen. Where a touch screen is used, the user may point to a new position for the fragment or may "drag" the fragment about the screen by pointing while moving the position of the finger on the screen. When the user has moved the selected fragment to a desired position, the user executes a subsequent step so that the selected fragment is released or "dropped" to assume its new position on the display screen.

A disadvantage of the known method is that it requires that multiple user commands be processed, namely those to move the image fragment, and those to drop the fragment. This generally requires processing interrupts from the input device. The situation is aggravated in the variant in which fragments are dragged, as there is a relatively high danger of "losing" the fragment as the finger or stylus is moved across the touch screen.

SUMMARY OF THE INVENTION

It is an object of the present invention to provide a method, system, apparatus and computer program of the types mentioned above that can function with a relatively low amount of user input.

This object is achieved by the method of the present invention, which is characterized by starting a first timer in response to receiving an indication of a destination location from a user through the interface and automatically causing the transition from the first state to the second state only after the first timer has run over a pre-determined period of time.

In particular, the present invention is directed to a method of providing a graphical user interface, including the steps of displaying a graphic representation of a data object at an initial location on a screen; receiving a command selecting the data object from a user through an interface; moving the graphical representation of the data object to a destination location on the screen upon receiving an indication of the destination location on the screen from a user through the interface; causing an at least indirect transition of the object from a first state to a second state at a time when the graphical representation of the data object is positioned substantially at a final destination location, wherein output is provided enabling a user to distinguish the first state from the second state; and starting a first timer in response to receiving an indication of a destination location from a user through the interface and automatically causing the transition from the first state to the second state only after the first timer has run over a pre-determined period of time.

Because the graphic representation is moved upon receiving an indication of a destination location, there is no need to "drag" the graphic representation across the screen, with the risk of having to re-select the object if it is "lost" halfway. This reduces the amount of information that must be processed, since a user would ordinarily have to take action to correct operations on the object associated with the location at which it has been "lost". Because both a first state and a second state are defined, it is possible to associate operations on the object with a completion of the transition to the second state. Because the transition is caused only after a first timer has run over a pre-determined period of time and the first and second states are distinguishable, the user has time to take corrective action if the user has indicated an incorrect location, before such operations are performed. This obviates the need to process a more elaborate set of user commands to undo the operations. The automatic transition makes a confirmation command unnecessary.

It is observed that U.S. Pat. No. 6,590,568 discloses a technique utilizing touch screen inputs for dragging and dropping objects displayed on the touch screen. The process begins at a first step, at which the touch of an object is detected. A determination is made that the pressure between the object and the touch screen at a first location is greater than a first predetermined pressure for a first predetermined period of time. At a next step, the object is dragged across the face of the touch screen at a reduced pressure. At a subsequent step, a second touch input is detected by determining that the value of the pressure of the object on the touch screen at a second location is greater than a predetermined pressure for a time duration greater than a second predetermined period of time. At a last step the display of the item is moved from the first location on the touch screen to the second location on the touch screen. Thus, this method does not involve automatically causing a transition from the first state to the second state only after the first timer has run over a pre-determined period of time. Instead, it involves a form of "dragging" the graphical representation of the data object across a touch screen. Therefore, the transition is not unconditional upon other criteria than completion of a time period, as in the method of the present invention. Furthermore, this known method does not include causing a transition of an object from a first state to a second state, distinguishable by a user, at a time when the graphical representation of the data object is positioned substantially at a final destination location.

According to another aspect of the method of the present invention, the transition to the third state is caused after receiving the command selecting the data object, and a transition from the third state to the first state is caused upon receiving a first indication of the destination location on the screen from a user through the interface.

The third state need not be distinguishable from the first state. The effect of the method is to ensure that the user knows to which object or objects the indications of a destination location entered by the user relate. Inadvertent movements of graphic representations with the attendant need to process subsequent corrective user input are thus avoided. The method achieves this effect by the special feature of the second state, and providing output enabling a user to distinguish the first and third state from the second state. The second state in effect corresponds to an "idle" or "normal" state. Thus, the method contributes to achieving the aim of processing relatively few user commands when a graphical representation is to be moved from the initial location to a destination location. Because the graphic representation is moved upon receiving an indication of a destination location, there is no need to "drag" the graphic representation across the screen, with the risk of having to re-select the object if it is "lost" halfway. This reduces the amount of information that must be processed, since a user would ordinarily have to take action to correct operations on the object associated with the location at which it has been "lost". Because both a second and a first and third state are defined, and output is provided enabling a user to distinguish the second state from the others, the user is left in no doubt as to which object his indication of a destination relates to. Thus, the risk of having to process user commands to reverse movement of the wrong object is reduced.

A variant of the method according to the present invention includes the steps of starting a second timer at the transition to the third state, and automatically causing a transition from the third state to the second state if no indication of a destination location is received before the second timer has run over a second pre-determined period of time.

This avoids the need to process user input by de-selecting an object inadvertently selected for movement.

An embodiment of method of the present invention includes the steps of accepting a plurality of indications of destination locations from the user through the interface only prior to completion of the transition of the object to the second state, wherein the final destination location is selected to correspond to a last accepted one of the plurality of indicated destination locations.

This has the effect that, within a certain time-period in which the object is not yet in the second state, the user can change the position of the graphic representation of that object with minimal input. Embodiments become possible in which the user need not select the object, or even enter a command to make its graphic representation "movable". The embodiment prevents the processing of a series of user commands from a user who has realized that the effect of the input does not correspond to the user's original intentions.

In a further embodiment of the method of the present invention, each time one of the plurality of indications is accepted, the graphic representation of the object is moved towards the latest indicated destination location with the object in the first state.

Thus, the user is able to assess the need to take corrective action before the end of the pre-determined time period. This further helps to avoid having to process more than a minimal number of user commands.

In another embodiment of the method of the present invention, each step of moving the graphic representation of the data object to a destination location includes displaying the graphic representation moving substantially continuously in a direction of the destination location such that the graphic representation is overlaid on a background image.

The effect is to provide a simple perceptible indication of the fact that the object is in the first state, and also to allow the user to assess the effect of his input. Moreover, it confirms the acceptance of user input received through the interface.

A variant of this embodiment of the method of the present invention includes displaying the graphic representation moving at a rate such as to result in the graphic representation reaching a most recently indicated destination location at a point in time coinciding substantially with at least a start of the at least indirect transition from the first state to the second state.

This ensures that the fact that the graphic representation is moving is always an indication of the first state. The graphic representation is always moving when the object is in the first state, and a moving representation means the object is in the first state.

In another embodiment of the method of the present invention, the interface comprises a touch-sensitive screen, and at least one of the command selecting the data object and indications of destination locations are received as a signal generated in response to contact at a point on the touch-sensitive screen.

This is a particularly useful application of the general method of the present invention, because of the risk of "losing" a graphic representation when "dragging" it across the screen. By moving the graphic representation across the screen upon receiving an indication of a destination location, yet starting a timer to delay a transition from a first state to a second state, the need to maintain contact with sufficient pressure over a longer period of time is removed. At the same time, the risk that many movement operations will have to be undone is reduced.

According to another aspect of the present invention, the system for providing a graphical user interface is characterised in that the system is configured to execute the method according to the present invention.

According to another aspect of the present invention, there is provided an apparatus, for example a document-processing apparatus, comprising a graphical user interface obtainable by the method according to the present invention.

According to another aspect of the present invention, there is provided a computer program, configured, when loaded and executed in a computer, programmed computer network of other programmable apparatus, to put into force a method according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
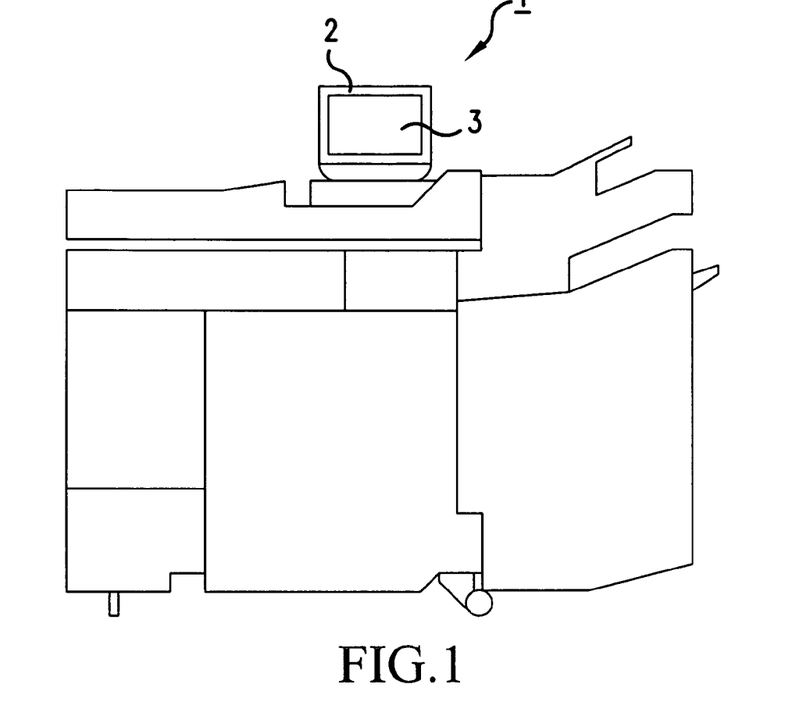
FIG. 1 is a schematic view illustrating a document-processing device configured to provide a user interface.

A document-processing device 1 is one example of an apparatus that is suitable for implementing the method of providing a graphical user interface that will be explained below. Other examples include a tablet-type personal computer, a Personal Digital Assistant, a cellular phone or a smart phone, and a navigation system. Generally any apparatus including a system comprising a screen, an interface for receiving user input and a system for processing and controlling output on the screen is suitable. The document-processing device 1 includes a touch-screen display 2, including a touch-sensitive screen 3. In this embodiment, the interface for receiving user input is incorporated in the screen. In other embodiments, a different type of interface is used to receive user input indicating locations on a screen.

The touch-sensitive screen 3 generates a signal in response to contact at a point on the touch-sensitive screen 3. The touch-sensitive screen 3 may operate in conjunction with a stylus or other indicating device. The method outlined herein relies only on position signals, indicating the location of contact on the touch-sensitive screen 3. For this reason, any type of touch-sensitive screen, including those using capacitative sensing, may be employed. There is no limitation to pressure-sensitive screens, as there is no reliance on a pressure signal.

Figure 2:
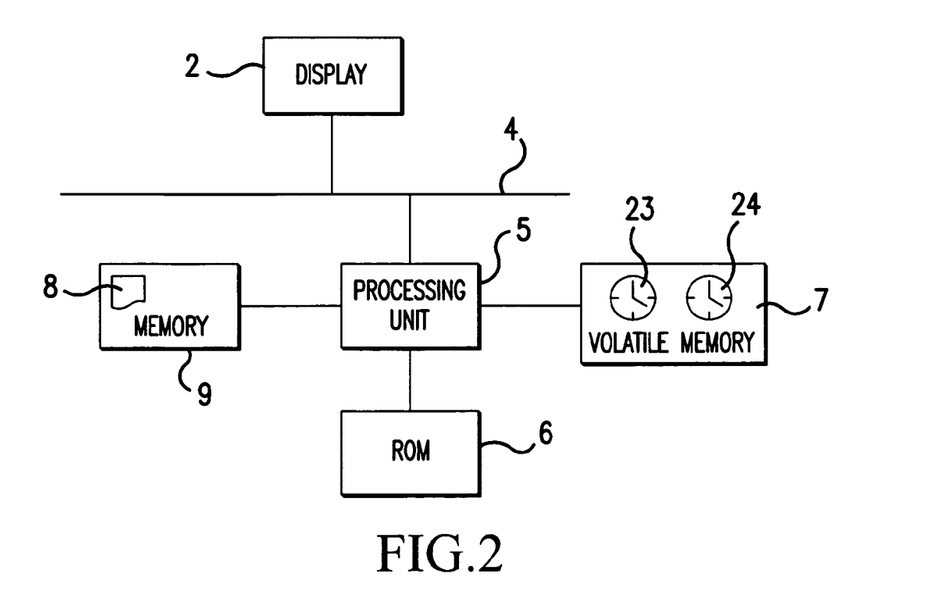
FIG. 2 is a schematic view illustrating selected hardware components of a system for providing the user interface.

Referring to FIG. 2, the touch-screen display 2 is connected to a bus 4. Also connected to the bus 4 is a processing unit 5. The processing unit 5 provides the graphical user interface outlined herein by executing instructions comprised in a computer program stored in Read-Only Memory 6. Variables are temporarily stored in volatile memory 7. Files, such as a document file 8, are stored in non-volatile memory 9, for example a hard-disk drive or electronically programmable read-only memory device. To provide the graphical user interface, the processing unit processes signals generated by the touch-screen display 2 in response to contact at a point on the touch-sensitive screen 3, which it receives via the bus 4. Other architectures are also possible.

Figure 5:
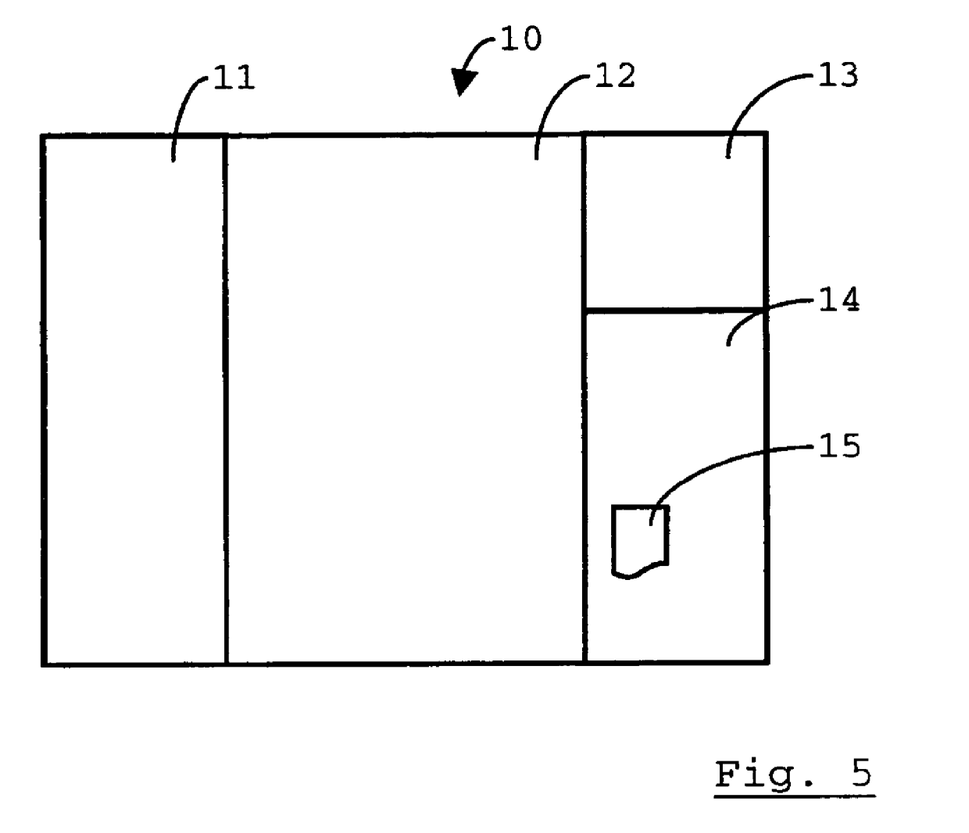
FIG. 5 is a schematic view of an example of the screen view subsequent to movement of the icon across the screen.
Figure 6:
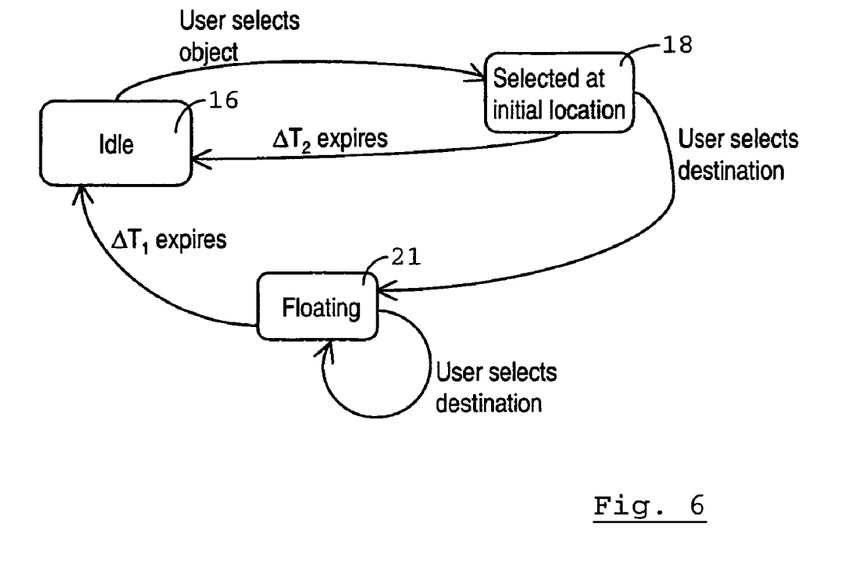
FIG. 6 is a state diagram illustrating a first embodiment of a method of providing a graphical user interface.
Figure 7:
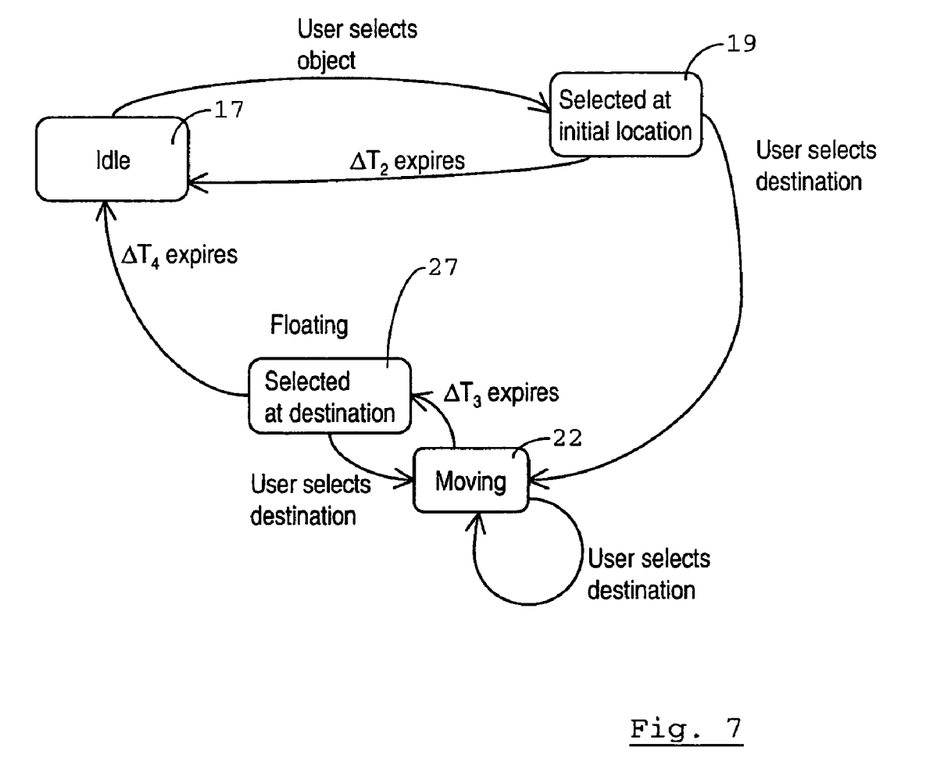
FIG. 7 is a state diagram illustrating a second embodiment of a method of providing a graphical user interface.

Two ways of providing a graphical user interface are illustrated in FIGS. 6 and 7, and will be referred to below in conjunction with FIGS. 3-5, which provide screen views associated with various stages of the respective methods. FIGS. 6 and 7 illustrate states of an object such as the document file 8. These states are user interaction states, meaning that they determine the object's susceptibility to user interaction signals.

Figure 3:
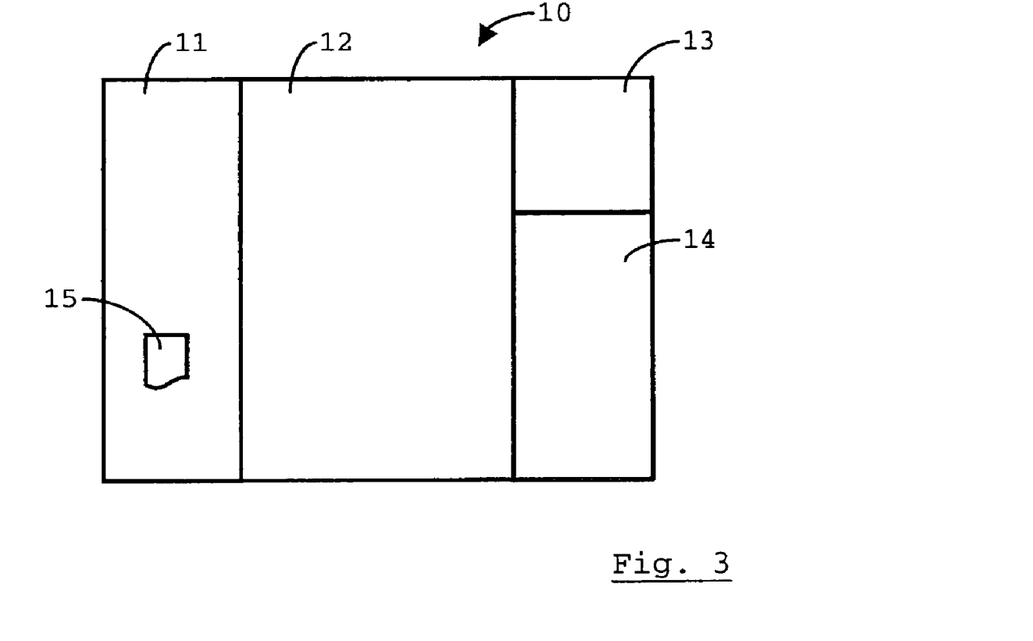
FIG. 3 is a schematic view of an example of a screen view prior to moving an icon.

In FIG. 3, a screen area 10 is shown as being divided into a left-hand area 11, a central area 12, and upper and lower right-hand areas 13,14, respectively. An icon 15 graphically represents the document file 8 shown in FIG. 2. The document file 8 is just one example of a type of data object that may be graphically represented. Other examples include code representing commands, variables in memory, pointers to locations in memory or sections of the screen area 10, as well as data constructs for accessing features of components of the document-processing device 1.

The left-hand area 11, central area 12 and upper and lower right-hand areas 13,14 represent locations for storing the document file 8, logically (i.e. a location in a directory tree) and/or physically (in case there are several memory devices in addition to the non-volatile memory 9). One or more of these areas 11-14 can also represent operations to be carried out on a data object once its graphic representation has been moved to it. An example is the printing of at least part of the document file 8 if the icon 15 is moved to a particular area.

In FIG. 3, the icon 15 representing the document file 8 is shown at an initial location within the left-hand area 11 of the screen 3. As far as the system providing the graphical user interface is concerned, the object represented by the icon 15 is in a non-floating state, which is reflected by the manner in which it appears on the touch-sensitive screen 3. This state is represented as an "Idle" state 16 in FIG. 6 and as a similar "Idle" state 17 in FIG. 7.

At a first point in time, a user selects the document file 8, preferably by making contact with the touch-sensitive screen 3 at the location of the icon 15 at least once.

In one embodiment (not shown) of the present invention, the state of the object represented by the icon now changes to "Floating". In the embodiments shown in FIGS. 6 and 7, the state changes only to "Selected" states 18 and 19, respectively.

At the latest upon receiving an indication of a first destination location 20 (FIG. 4) in the upper right-hand area 13 of the touch-sensitive screen 3, the system changes the object's state to a "Floating" state 21, in the embodiment of FIG. 6, or "Moving" state 22, in the embodiment illustrated in FIG. 7. In some alternative embodiments (not shown), the "Floating" state is a sub-state of the "Selected" state.

Although this description uses only the example of a single icon 15, other embodiments allow multiple graphic representations of respective objects to be selected and moved. In such an embodiment, dragging a finger or stylus around the icons representing the several data objects, for example, can carry out selection.

The system provides output enabling a user to distinguish the "Floating" and "Moving" states 21,22 from the "Idle" state 16,17. In the example shown in FIG. 4, the output is visible, in that the appearance of the icon 15 changes. Specifically, a shaded outline is shown around the icon 15. In other embodiments, the icon changes color and/or shape. Alternatively or additionally, the "Floating" state 21 and/or the "Moving" state 22 may be audibly identifiable. In any case, the transition to the "Floating" state 21 or "Moving" state 22 occurs after receipt of a command selecting the object represented by the icon 15. The fact that the "Floating" state 21 of the embodiment of FIG. 6 and the "Moving" state of the embodiment of FIG. 7 are discernable as such prevents repeated input of commands by the user and the attendant interrupts to the processing unit 5. This is especially the case where the "Selected" state 18,19 is also discernible as such, or at least causes the icon 15 to have the same appearance as in the "Floating" state 21 or the "Moving" state 22.

In the embodiments illustrated in FIGS. 6 and 7, where the transition to the "Selected" state 18,19 occurs prior to receipt of a signal indicating the first destination location 20—and therefore prior to transition to the "Floating" state 21 and "Moving" state 22, respectively—two timers are employed. The timers are advantageously implemented as variables in volatile memory 7, using a clock of the processing unit 5, for example. A first timer 23 is started upon receiving the signal indicating the first destination location 20.

A second timer 24 is started on transition to the "Selected" state 18,19. If the second timer 24 has run over an associated pre-determined period of time $\Delta T_2$ without any indication of a destination location being received, the system providing the graphical user interface automatically causes a transition from the "Selected" state 18,19 back to the "Idle" state 16,17. The icon 15 resumes the appearance as shown in FIG. 3.

As long as the object represented by the icon 15 is in the "Floating" or "Moving" state 21,22 or the "Selected" state 18,19, the system is receptive to user commands providing an indication of a destination location. As mentioned, a first timer 23 is started upon receipt of an indication of the first destination location 20.

In the embodiment shown in FIG. 6, when the first timer 23 has run over a pre-determined period of time $\Delta T_1$, a transition from the "Floating" state 21 to a final state takes place. In the embodiment shown in FIG. 6, the final state corresponds to the "Idle" state 16.

The icon 15 is moved to the destination location last indicated by the user whilst the object represented by it is in the "Floating" state 21. Thus, as illustrated in FIG. 4, a user can indicate a second destination location 25, this time within the lower right-hand area 14, without having to provide the input necessary to put the object represented by the icon 15 into the "floating" state. There are thus fewer interrupts to the processing unit 5 if the user changes his mind about the final destination location. In one variant, the first timer 23 is re-initialized each time a further indication of a destination location is received through the user interface. In another variant of the embodiment shown in FIG. 6, it continues to run.

In one embodiment, the icon 15 disappears from its initial location and re-appears at the final destination location substantially at the end of the pre-determined period of time $\Delta T_1$. In other embodiments, as in those to which FIG. 4 pertains, the icon 15 moves along a trajectory, indicated in dashed lines in FIG. 4, whilst the object is in the "Floating" state 21. The icon 15 moves continuously across the screen area 10, overlaid on a background image (the central area 12), so as to create a dynamic appearance. This provides a further visual output enabling the user to distinguish the "Floating" state 21 from other states.

Figure 4:
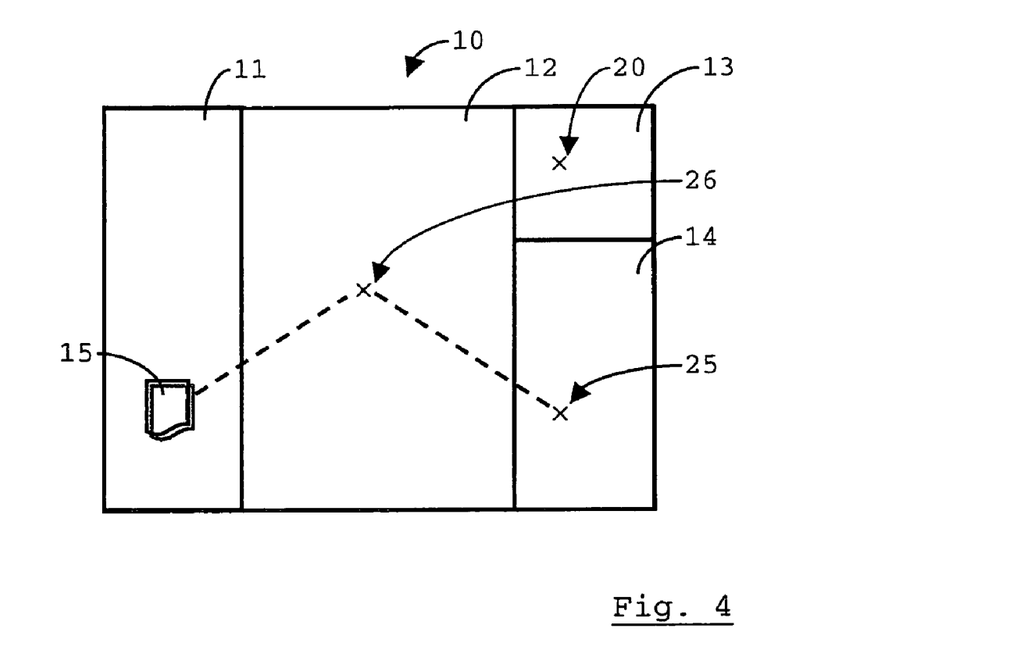
FIG. 4 is a schematic view illustrating movement of the icon across the screen.

As is shown in FIG. 4, the icon 15 moves in a substantially straight line towards the latest indicated destination location. In other embodiments, the icon 15 moves along a trajectory defined by a Bezier curve. In the example, the user command indicating the second destination location 25 is received when the icon 15 is at a location 26 half-way towards the first destination location 20. It then changes direction to move in a straight line towards the second destination location 25. In this manner, the user has a good idea of where the destination location last indicated by him lies. This is advantageous, because the system providing the graphical user interface acts on a signal indicating only a discrete destination location to moving the icon 15 to a new location. This is in contrast to "drag-and-drop" type user interfaces, where the icon 15 moves continuously with the point of contact being sensed by the touch-screen display 2.

In the embodiment shown in FIG. 6, the rate of movement along the trajectory indicated by the dashed line is adjusted, so that the icon 15 arrives at the final destination location at substantially the end of the pre-determined interval of time $\Delta T_1$ monitored by the first timer 23. Thus, the very fact that the icon 15 is moving is sufficient indication of the "floating" state. The shaded outline shown in FIG. 4 is not absolutely necessary in this embodiment. Moreover, it is clearer to the user that selection of an alternative destination location is still possible. In a first variant of this embodiment, the icon 15 moves across the screen area 10 at substantially constant speed subsequent to each selection of a destination location. In other variants, the icon 15 accelerates during a first part of the remainder of the interval of time $\Delta T_1$ and decelerates during a final part of the remainder of the interval of time $\Delta T_1$.

As shown in FIGS. 5 and 6, the transition to the final state occurs at the end of the pre-determined time interval $\Delta T_1$. The icon 15 in this embodiment assumes the appearance associated with the initial state, the "Idle" state 16. In other embodiments, the appearance associated with the final state differs from that associated with the initial state.

The embodiment illustrated in FIG. 7 differs from the embodiment shown in FIG. 6, because, in addition to the "Moving" state 22 it includes a state 27 of "Selected at Destination". The "Moving" state 22 corresponds substantially to the "Floating" state 21 in the embodiment described above with reference to FIG. 6.

In the embodiment of FIG. 7, the first timer 23 is started upon transition from the "Selected" state 19 to the "Moving" state 22. When the first timer 23 has run over a pre-determined period of time $\Delta T_3$, a transition from the "Moving" state 22 to the state 27 "Selected at Destination" takes place. The icon 15 retains an appearance differing from that associated with the "Idle" state 17. If no further indications of destination locations are received during a time interval $\Delta T_4$, then the transition to the "Idle" state 17 is brought about. If a further indication of a destination location is received when the document file 8 is in the state 27 "Selected at Destination," then the object returns to the "Moving" state 22. The first timer 23 is re-started in response to receiving this further indication of a destination location.

Thus, the (in this case indirect) transition from the "Moving" state 22 to the "Idle" state 17 always takes place after the first timer 23 has run over a composite interval of time equal to the sum of the two time intervals $\Delta T_3$, $\Delta T_4$. Depending on the user input, this composite interval starts at the transition from the "Selected" state 19 to the "Floating" state 22, or at the transition to the "Moving" state 27 while the document file 8 is already in the "Floating" state. In an alternative embodiment (not shown), the time interval $\Delta T_4$ always starts at the first transition to the "Floating" state 22, and the transition always takes place when the first timer 23 has run for the duration of that time interval $\Delta T_4$.

The present invention is not limited to the embodiments described above, which may be varied within the scope of the accompanying claims. Advantageous effects similar to those described above are attainable in graphical user interfaces using a touch-sensitive panel separate from the screen as a user input device. Although the icons have been illustrated as graphic representations of data objects, image fragments—for example sections of digitised photographic images—may be used instead.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of providing a graphical user interface, comprising the steps of:
   displaying a graphic representation of a data object at an initial location on a screen;
   receiving a command selecting the data object from a user through an interface;
   moving the graphical representation of the data object towards a destination location on the screen upon receiving an indication of the destination location on the screen from a user through the interface;

causing an at least indirect transition of the object from a first state to a second state at a time when the graphical representation of the data object is positioned substantially at a final destination location, wherein output is provided enabling a user to distinguish the first state from the second state;

starting a first timer in response to receiving an indication of a destination location from a user through the interface and automatically causing the transition from the first state to the second state only after the first timer has run over a pre-determined period of time;

causing a transition of the data object to a third state, wherein output is provided enabling a user to distinguish the third state from the second state, the transition to the third state is caused after receiving the command selecting the data object, and a transition from the third state to the first state is caused upon receiving a first indication of the destination location on the screen from a user through the interface; and starting a second timer at the transition to the third state; and automatically causing a transition from the third state to the second state if no indication of a destination location is received before the second timer has run over a second pre-determined period of time.

2. The method according to claim 1, further comprising the step of accepting a plurality of indications of destination locations from the user through the interface only prior to completion of the transition of the object to the second state, wherein the final destination location is selected to correspond to a last accepted one of the plurality of indicated destination locations.

3. The method according to claim 1, further comprising the step of accepting a plurality of indications of destination locations from the user through the interface only prior to completion of the transition of the object to the second state, wherein the final destination location is selected to correspond to a last accepted one of the plurality of indicated destination locations.

4. The method according to claim 1, further comprising the step of accepting a plurality of indications of destination locations from the user through the interface only prior to completion of the transition of the object to the second state, wherein the final destination location is selected to correspond to a last accepted one of the plurality of indicated destination locations.

5. The method according to claim 2, wherein, each time one of the plurality of indications is accepted, the graphic representation of the object is moved towards the latest indicated destination location with the object in the first state.

6. The method according to claim 3, wherein, each time one of the plurality of indications is accepted, the graphic representation of the object is moved towards the latest indicated destination location with the object in the first state.

7. The method according to claim 4, wherein, each time one of the plurality of indications is accepted, the graphic representation of the object is moved towards the latest indicated destination location with the object in the first state.

8. The method according to claim 1, wherein each step of moving the graphic representation of the data object to a destination location includes displaying the graphic representation moving substantially continuously in a direction of the destination location such that the graphic representation is overlaid on a background image.

9. The method according to claim 8, further comprising the step of displaying the graphic representation moving at a rate such as to result in the graphic representation reaching a most recently indicated destination location at a point in time coinciding substantially with at least a start of the at least indirect transition from the first state to the second state.

10. The method according to claim 1, wherein the interface comprises a touch-sensitive screen, and at least one of the command selecting the data object and indications of destination locations are received as a signal generated in response to contact at a point on the touch-sensitive screen.

11. A system for providing a graphical user interface, comprising: a screen; an interface that receives user input; and a system that processes and controls output on the screen, said system including:

means for displaying a graphic representation of a data object at an initial location on the screen;

means for receiving a command selecting the data object from a user through the interface;

means for moving the graphical representation of the data object towards a destination location on the screen upon receiving an indication of the destination location on the screen from a user through the interface;

means for causing an at least indirect transition of the object from a first state to a second state at a time when the graphical representation of the data object is positioned substantially at a final destination location, wherein output is provided enabling a user to distinguish the first state from the second state;

means for starting a first timer in response to receiving an indication of a destination location from a user through the interface and automatically causing the transition from the first state to the second state only after the first timer has run over a pre-determined period of time;

means for causing a transition of the data object to a third state, wherein output is provided enabling a user to distinguish the third state from the second state, the transition to the third state is caused after receiving the command selecting the data object, and a transition from the third state to the first state is caused upon receiving a first indication of the destination location on the screen from a user through the interface; and means for starting a second timer at the transition to the third state; and automatically causing a transition from the third state to the second state if no indication of a destination location is received before the second timer has run over a second pre-determined period of time.

12. The system according to claim 11, wherein the screen is included in a document-processing apparatus.

13. A computer program embodied on a computer readable medium, said computer program including a set of instructions that are capable of performing the steps of: displaying a graphic representation of a data object at an initial location on a screen; receiving a command selecting the data object from a user through an interface; moving the graphical representation of the data object towards a destination location on the screen upon receiving an indication of the destination location on the screen from a user through the interface;

causing an at least indirect transition of the object from a first state to a second state at a time when the graphical representation of the data object is positioned substantially at a final destination location, wherein output is provided enabling a user to distinguish the first state from the second state;

starting a first timer in response to receiving an indication of a destination location from a user through the interface and automatically causing the transition from the first state to the second state only after the first timer has run over a pre-determined period of time;

causing a transition of the data object to a third state, wherein output is provided enabling a user to distinguish the third state from the second state, the transition to the third state is caused after receiving the command selecting the data object, and a transition from the third state to the first state is caused upon receiving a first indication of the destination location on the screen from a user through the interface; and starting a second timer at the transition to the third state; and automatically causing a transition from the third state to the second state if no indication of a destination location is received before the second timer has run over a second pre-determined period of time.

* * * * *